US008756507B2

(12) United States Patent
Fong et al.

(10) Patent No.: US 8,756,507 B2
(45) Date of Patent: Jun. 17, 2014

(54) MOBILE MEDIA DEVICE USER INTERFACE

(75) Inventors: Jeffrey C. Fong, Seattle, WA (US); D. Graham Stinson, Seattle, WA (US); Miguel Guerrero, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 12/491,045

(22) Filed: Jun. 24, 2009

(65) Prior Publication Data

US 2010/0332988 A1    Dec. 30, 2010

(51) Int. Cl.
*G06F 3/16* (2006.01)
*G06F 3/00* (2006.01)
*H04N 5/445* (2011.01)

(52) U.S. Cl.
CPC .............. *G06F 3/16* (2013.01); *H04N 5/44543* (2013.01)
USPC .............................. 715/727; 715/716; 725/50

(58) Field of Classification Search
USPC ..................................... 725/50; 715/727, 716
See application file for complete search history.

(56) References Cited

U.S. PATENT DOCUMENTS

| | | | |
|---|---|---|---|
| 5,918,213 A | 6/1999 | Bernard et al. | |
| 6,317,784 B1 * | 11/2001 | Mackintosh et al. | ......... 709/219 |
| 7,099,348 B1 | 8/2006 | Warwick | |
| 7,647,419 B2 * | 1/2010 | Deshpande | ................. 709/231 |
| 7,653,342 B2 * | 1/2010 | Nichols et al. | ............. 455/3.01 |
| 7,676,203 B2 * | 3/2010 | Chumbley et al. | ......... 455/186.1 |
| 7,801,500 B2 * | 9/2010 | Kraft et al. | ................. 455/160.1 |
| 7,840,178 B2 * | 11/2010 | Hellman | ....................... 455/3.02 |
| 8,244,171 B2 * | 8/2012 | Ingrassia et al. | ............. 455/3.04 |
| 8,249,497 B2 * | 8/2012 | Ingrassia et al. | ............. 455/3.01 |
| 8,291,320 B2 * | 10/2012 | Robbin et al. | ................. 715/716 |
| 8,423,545 B2 * | 4/2013 | Cort et al. | ....................... 707/736 |
| 8,423,582 B2 * | 4/2013 | Griggs | ............................ 707/802 |
| 8,443,007 B1 * | 5/2013 | Kindig et al. | .................. 707/800 |
| 8,515,337 B2 * | 8/2013 | Ingrassia et al. | ............. 455/3.01 |
| 8,527,876 B2 * | 9/2013 | Wood et al. | .................... 715/716 |
| 8,571,466 B2 * | 10/2013 | Ingrassia et al. | ............. 455/3.04 |
| 2005/0022237 A1 | 1/2005 | Nomura | |

(Continued)

FOREIGN PATENT DOCUMENTS

| | | |
|---|---|---|
| JP | 09321645 | 12/1997 |
| JP | 2001298430 | 10/2001 |
| JP | 2001522121 | 11/2001 |
| WO | 2007101169 A1 | 9/2007 |

OTHER PUBLICATIONS

"Client Self-Management", Retrieved at <<http://www.iwayradio.com/streaming-control-panel.html>>, Apr. 28, 2009, pp. 1-5.

(Continued)

*Primary Examiner* — David Phantana Angkool
(74) *Attorney, Agent, or Firm* — Andrew Sanders; Micky Minhas; Wolfe-SBMC

(57) ABSTRACT

A mobile media device user interface is described. In one or more implementations, output of a plurality of audio content is monitored by a mobile media device. Each of the audio content was received via a respective one of a plurality of broadcast channels by the mobile media device. A user interface is displayed on a display device of the mobile media device, the user interface describing each of the plurality of audio content and the respective broadcast channel from which the audio content was received.

20 Claims, 6 Drawing Sheets

(56) References Cited

U.S. PATENT DOCUMENTS

| | | |
|---|---|---|
| 2005/0197906 A1 | 9/2005 | Kindig et al. |
| 2005/0240661 A1 | 10/2005 | Heller et al. |
| 2006/0085751 A1 | 4/2006 | O'Brien et al. |
| 2006/0156343 A1* | 7/2006 | Jordan .............................. 725/50 |
| 2006/0206582 A1* | 9/2006 | Finn .............................. 709/217 |
| 2006/0212442 A1* | 9/2006 | Conrad et al. ..................... 707/5 |
| 2007/0204227 A1 | 8/2007 | Kretz |
| 2008/0086379 A1 | 4/2008 | Dion et al. |
| 2008/0222546 A1* | 9/2008 | Mudd et al. ................... 715/765 |
| 2008/0243923 A1 | 10/2008 | Mazor et al. |
| 2009/0023406 A1 | 1/2009 | Ellis et al. |
| 2009/0030537 A1 | 1/2009 | Hartle |

OTHER PUBLICATIONS

Kibby, Marjorie, "Radio That Listens to Me: Y!Music Web Radio", Retrieved at <<http://www.swinburne.edu.au/hosting/ijets/journal/V4N2/pdf/V4N2-2-Kibby.pdf>>, Australian Journal of Emerging Technologies and Society, vol. 4, No. 2, 2006, pp. 1-13.

"International Search Report", Mailed Date: Feb. 22, 2011, Application No. PCT/US2010/039170, Filed Date: Jun. 18, 2010, pp. 8.

"Foreign Office Action", JP Application No. 2012-517610, Jan. 21, 2014, 6 Pages.

\* cited by examiner

MOBILE MEDIA DEVICE USER INTERFACE

BACKGROUND

Mobile media devices may be configured in a variety of different ways to output content from a variety of different sources. For example, a mobile media device may be configured as a handheld music player that may receive content wirelessly via a plurality of networks, such as via a broadcast network (e.g., a one-way communication channel such as FM radio) and a two-way network (e.g., that provides access to the Internet). However, it may be difficult for a user to determine what was recently played by the mobile media device by these different sources.

For example, a user may listen to a variety of different channels of a broadcast network, e.g., different FM radio stations. While audio content (e.g., a song) is being played, a display device of the mobile media device may output information that describes what is currently being played, e.g., a song title and artist. Once the song is done being played, however, the user is not able to access the information using a conventional mobile media device. Therefore, the user may be forced to rely solely on the user's own recollection to remember songs of interest.

SUMMARY

A mobile media device user interface is described. In one or more implementations, output of a plurality of audio content is monitored by a mobile media device. Each of the audio content was received via a respective one of a plurality of broadcast channels by the mobile media device. A user interface is displayed on a display device of the mobile media device, the user interface describing each of the plurality of audio content and the respective broadcast channel from which the audio content was received.

In one or more implementations, one or more computer-readable storage comprise instructions that are executable by a mobile media device to output a user interface that describes a plurality of content received via a broadcast and output by the mobile media device. The user interface has a plurality of options to purchase the plurality of content for download.

In one or more implementations, a mobile media device includes a display device and one or more modules. The one or more modules are configured to output a plurality of audio content that have been received wirelessly via one or more broadcast channels. A user interface is displayed on the display device that includes one or more of the audio content that is an advertisement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A mobile media device (e.g., a portable music player) may output audio content that was obtained from a variety of different sources, such as via a broadcast (e.g., AM, FM, or Satellite radio), via a two-way network (e.g., a stream provided by a website that is accessible via the Internet), and so on. Traditional techniques that were used to describe this content, however, were limited to what was currently being output by the mobile media device. For example, a traditional radio (e.g., in compliance with FM, and/or Satellite) may display a title and artist of a song that is currently being output. Once the output of the song has completed (e.g., the song has been played), however, conventional display techniques did not permit a user to determine what songs (or other audio content) was recently played.

A user interface for a mobile media device is described. In an implementation, the user interface is configured to describe audio content that was output by the mobile media device. For example, a user may interact with the mobile media device to navigate between broadcast channels (e.g., frequencies in FM radio) and output audio content (e.g., songs) from the channels. The mobile media device in this implementation is configured to store metadata that is streamed with and describes the audio content, even if the mobile media device is sequentially tuned to a variety of different broadcast channels. The metadata may then be output in a user interface to describe the audio content that was output by the mobile media device.

The user interface (and the metadata contained therein) may be leveraged in a variety of ways. For example, the user interface may be configured to provide a link to a website to purchase audio content that was recently played by the mobile media device. In another example, the user interface may be configured to include descriptions of audio content configured as advertisements that were broadcast with other audio content, e.g., songs. The description of the advertisements may also be configured to navigate to a corresponding website. Thus, in these examples information that describes broadcast content received by the mobile media device may be leveraged to obtain additional information from a two-way network, e.g., via the Internet. A variety of other examples are also contemplated, further discussion of which may be found in relation to the following sections.

In the following discussion, a mobile media device is described that may receive audio content wirelessly from a variety of different sources. However, it should be readily apparent that the following discussion is not to be limited to a mobile media device, audio content, or wireless communication. Accordingly, a variety of different devices may employ the techniques described herein without departing from the spirit and scope thereof, such as other computers such as desktop PCs, netbooks, wireless phones, personal digital assistants, and so on.

Example Environment

Figure 1:
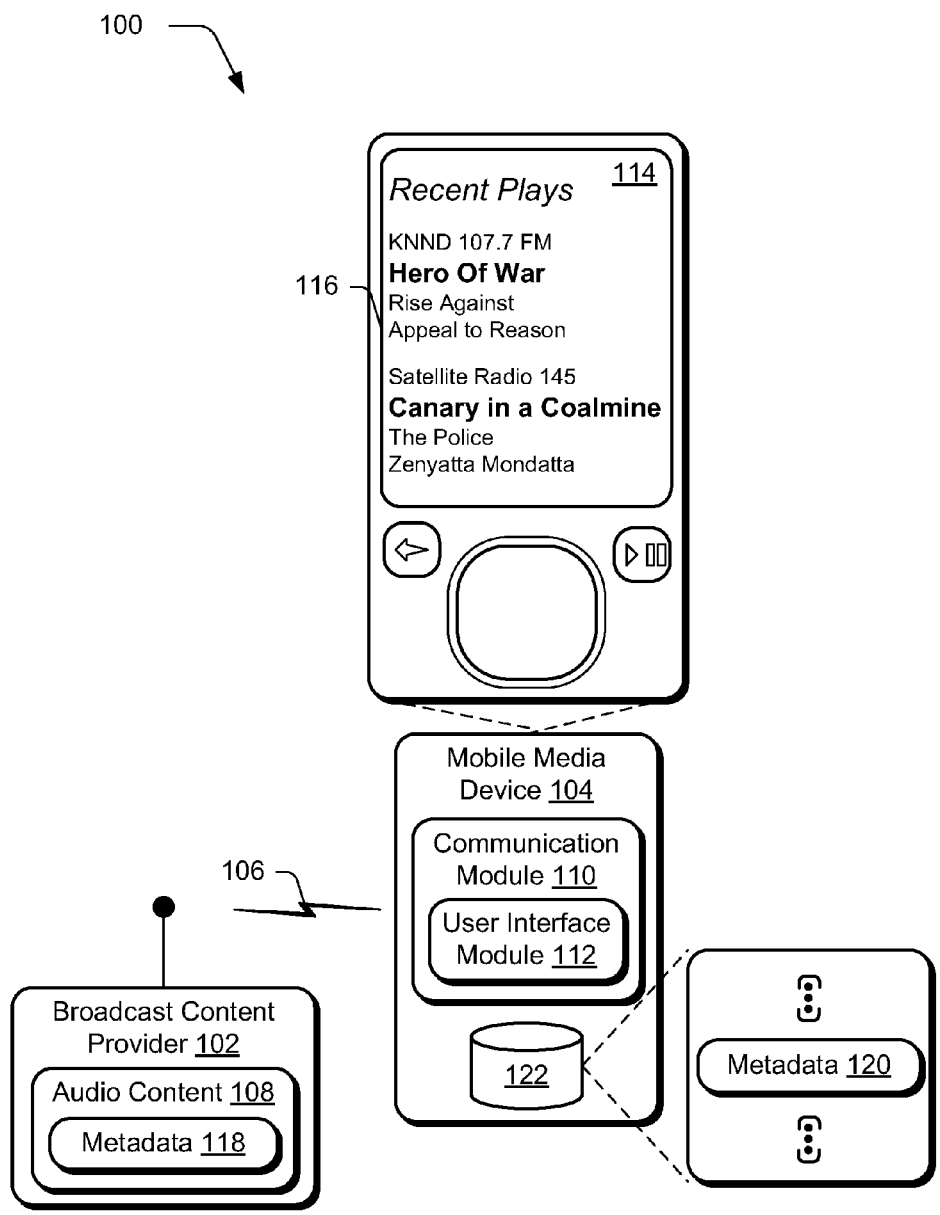
FIG. 1 is an illustration of an environment 100 in an example implementation that is operable to employ user interface generation techniques described herein.

FIG. 1 is an illustration of an environment 100 in an example implementation that is operable to employ user interface generation techniques described herein. The illustrated environment 100 includes a broadcast content provider 102 that is communicatively coupled to a mobile media device 104 via a wireless connection 106 to receive a broadcast of audio content 108. The mobile media device 104 may be configured in a variety of ways. For example, a communication module 110 of the media device 104 may include radio functionality to receive a frequency modulated (FM) signal, a signal from a satellite (e.g., Satellite radio), and so on. Thus, in this example the wireless connection 106 is a "one-way" connection from the broadcast content provider 102 that may broadcast to a plurality of mobile media device, e.g., the mobile media device 104.

Likewise, the broadcast content provider 102 may be configured in a variety of ways. For example, the broadcast content provider 102 may be configured as an FM radio station that broadcasts the audio content 108 using an FM signal as described above. The broadcast content provider 102 may also be configured as a satellite radio provider that broadcasts the audio content 108 via the wireless connection 106 using a satellite for direct receipt by the mobile media device 104. A variety of other examples are also contemplated, such as configuration for broadcast of audio content 108 in compliance with HD radio techniques, AM radio techniques, and so on.

The communication module 110 is further illustrated as including a user interface module 112. The user interface module 112 is representative of functionality of the mobile media device 104 to generate and maintain a user interface 114 for display on a display device 116 of the mobile media device 104. The user interface 114 may be configured in a variety of ways, such as to include a list of recently played content as illustrated in FIG. 1.

For example, the broadcast content provider 102 may broadcast the audio content 108 via the wireless connection to the mobile media device 104, as well as other mobile media devices. The audio content 108 is illustrated as including metadata 118 that describes and is streamed with the audio content 108. For example, the metadata 118 may include a title, artist, album name, genre, contain links to a network site (e.g., an ecommerce website to purchase like content, a fan website, etc), a broadcast time, and so on.

The user interface module 112 of the communication module 110 may then parse the received broadcast to remove the metadata 118 and store it, an example of which is illustrated as metadata 120 stored in storage 122 (e.g., persistent memory) of the mobile media device 104. The user interface module 112 may then leverage the metadata 120 to generate the user interface 114.

As illustrated in the environment 100 of FIG. 1, for instance, the user interface describes a source of the broadcast (e.g., KNND 107.7 FM), a title (e.g., Hero of War), an artist (e.g., Rise Against), and an album (e.g., Appeal to Reason). Further, the user interface describes audio content received via a variety of different sources, which are illustrated as 107.7 FM and Satellite Radio 145. In this way, the user interface 114 may summarize navigation that is performed from broadcast content provider to broadcast content provider 102 in a single screen in the user interface 114. The description of the audio content that is output by the mobile media device 104 may be leveraged in a variety of ways, an example of which may be found in relation to the following figure.

Figure 2:
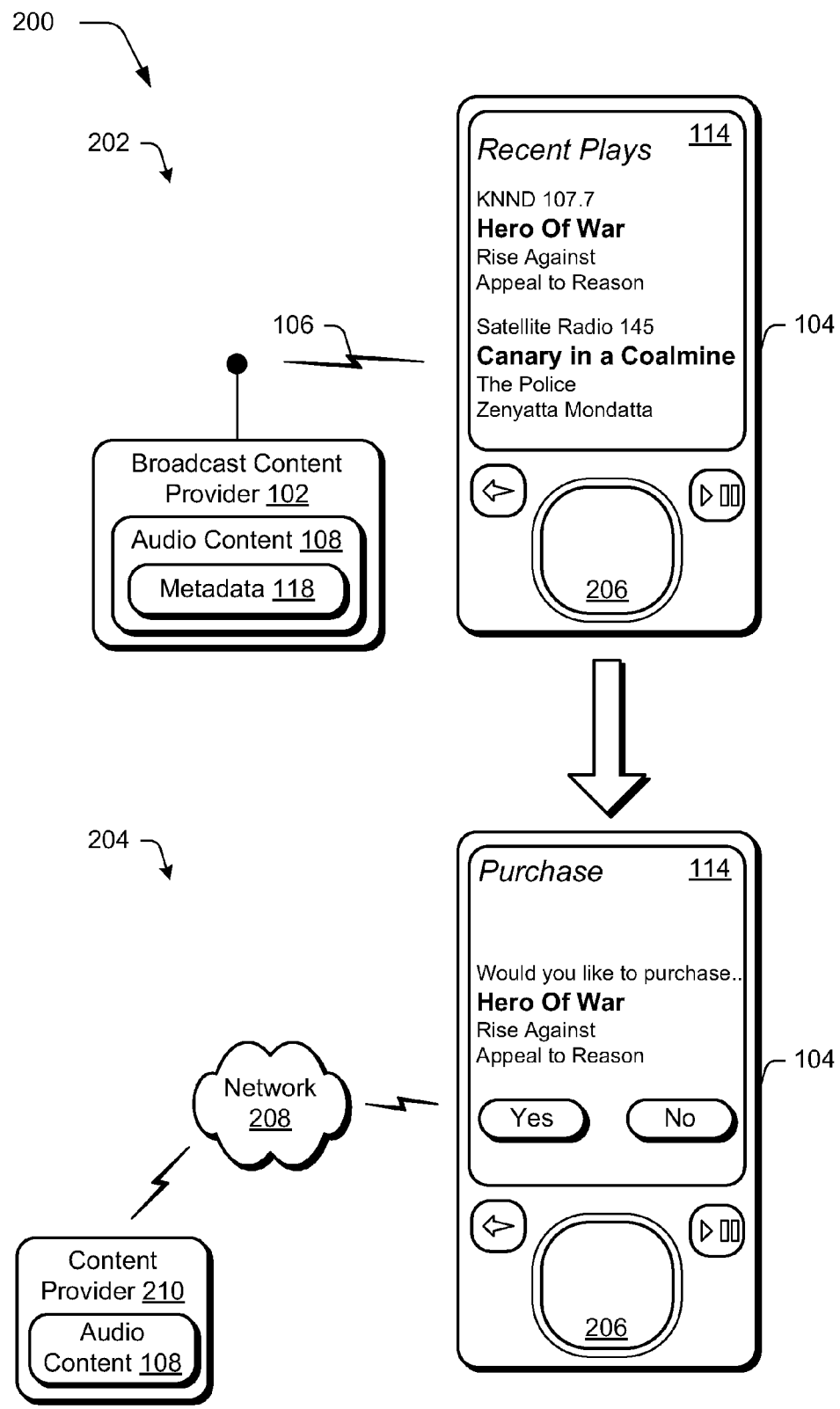
FIG. 2 is an illustration of a system in an example implementation showing a mobile media device of FIG. 1 as configuring a user interface to purchase audio content.

FIG. 2 is an illustration of a system 200 in an example implementation showing the mobile media device 102 of FIG. 1 as configuring the user interface 114 to purchase audio content. The system 200 includes first and second instances 202, 204 of the mobile media device 104. In the first instance 202, the mobile media device 104 is illustrated as receiving the audio content 108 from the broadcast content provider 102 as described in FIG. 1. Thus, in the first instance 106 the audio content 108 is received from the broadcast content provider 102 via a one-way network.

The audio content 108 includes metadata 118 that is used by the mobile media device 104 to generate the user interface 114 that includes descriptions of the audio content 108. In the illustrated instance the audio content 108 is described in an order that follows an order in which the audio content 108 was output. A variety of other examples are also contemplated, such as displayed in groups arranged by broadcaster, and so on. In an implementation, at least a portion of the descriptions of the audio content 108 in the user interface 114 are selectable (e.g., via a cursor control device 206 to select a title shown in bold) to initiate an operation to purchase the audio content 108.

As shown in the second instance 204, the user interface 114 outputs an option that is selectable to cause the audio content 108 to be purchased. For example, the communication module 110 of the mobile media device 104 may include functionality to communicate via a two-way network, which is illustrated as network 208 in FIG. 2. The network 208 may be configured in a variety of ways, such as to include a wide area network (WAN), a local area network (LAN), a wireless network, a public telephone network, an intranet, and so on. Further, although a single network 208 is shown, the network 108 may be configured to include multiple networks. The network 208, for instance, may include a wireless telephone network that provides access to the Internet. A variety of other examples are also contemplated.

Once the option is selected (e.g., by selecting "yes" in the user interface 114 using the cursor control device 206), the user interface 114 may be configured to provide navigation to a content provider 210 via the network 208 to purchase the audio content 108 that was described in the user interface 114. For example, the communication module 110 may include browser functionality to navigate to a website maintained by the content provider 210 to purchase content.

Thus, in the illustrated system 200 the mobile media device 114 outputs audio content 108 that was received via a one-way network (e.g., an FM signal, satellite signal, HD radio signal, and so on). Descriptions of the audio content 108 are then leveraged to provide an option to purchase the audio content 108 via a two-way network, e.g., via access to a two-way network such as when the mobile media device 102 includes telephone functionality. The audio content 108 may be purchased in a variety of ways, further discussion of which may be found in relation to the following figure.

Figure 3:
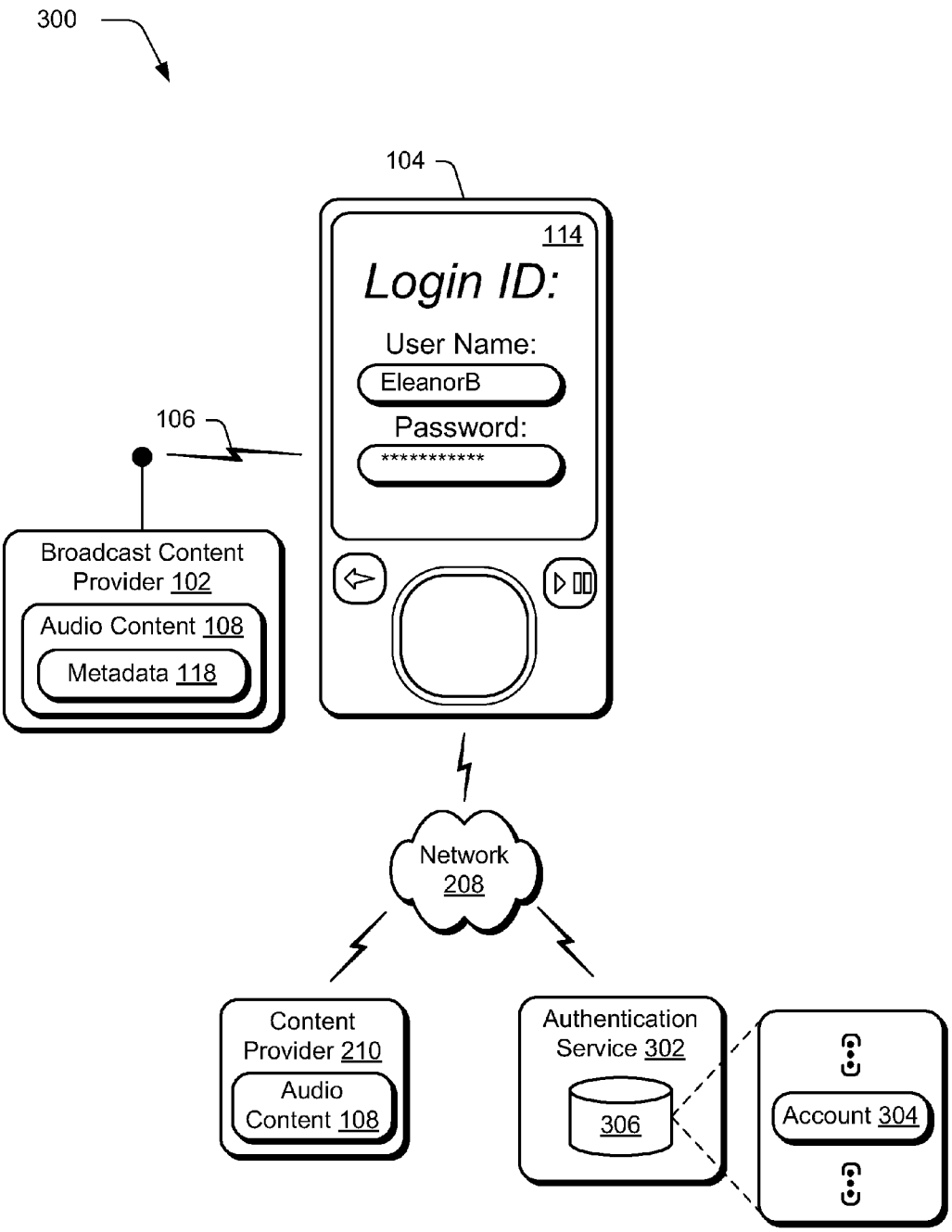
FIG. 3 is an illustration of a system in an example implementation that is configured to authenticate a user to purchase audio content.

FIG. 3 illustrates a system 300 in an example implementation that is configured to authenticate a user to purchase audio content 108. As before, the audio content 108 is originally received from a broadcast content provider 102. In order to purchase the audio content from the content provider 210, a user of the mobile media device 104 is first authenticated by an authentication service 302.

As illustrated, the user interface 114 may be configured to accept credentials from the user, examples of which include a user name and password. The credentials may then be communicated via the network 208 to the authentication service 302 for comparison with credentials of an account 304. If authenticated, a token may be passed back to the mobile media device 104 that is usable to access a plurality of websites without reentering the credentials. Thus, the token may be used by the mobile media device 104 to access the content provider 210 (and more particularly a website maintained by the content provider 210) to purchase the audio content 108. In an implementation, the purchase may also be made in conjunction with the authentication service 302, e.g., by obtaining account information, charging the account 304, and so on.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the user interface techniques described below are platform-independent, meaning that the techniques may be implemented on a variety of commercial computing platforms having a variety of processors.

Example Procedures

The following discussion describes user interface techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3.

Figure 4:
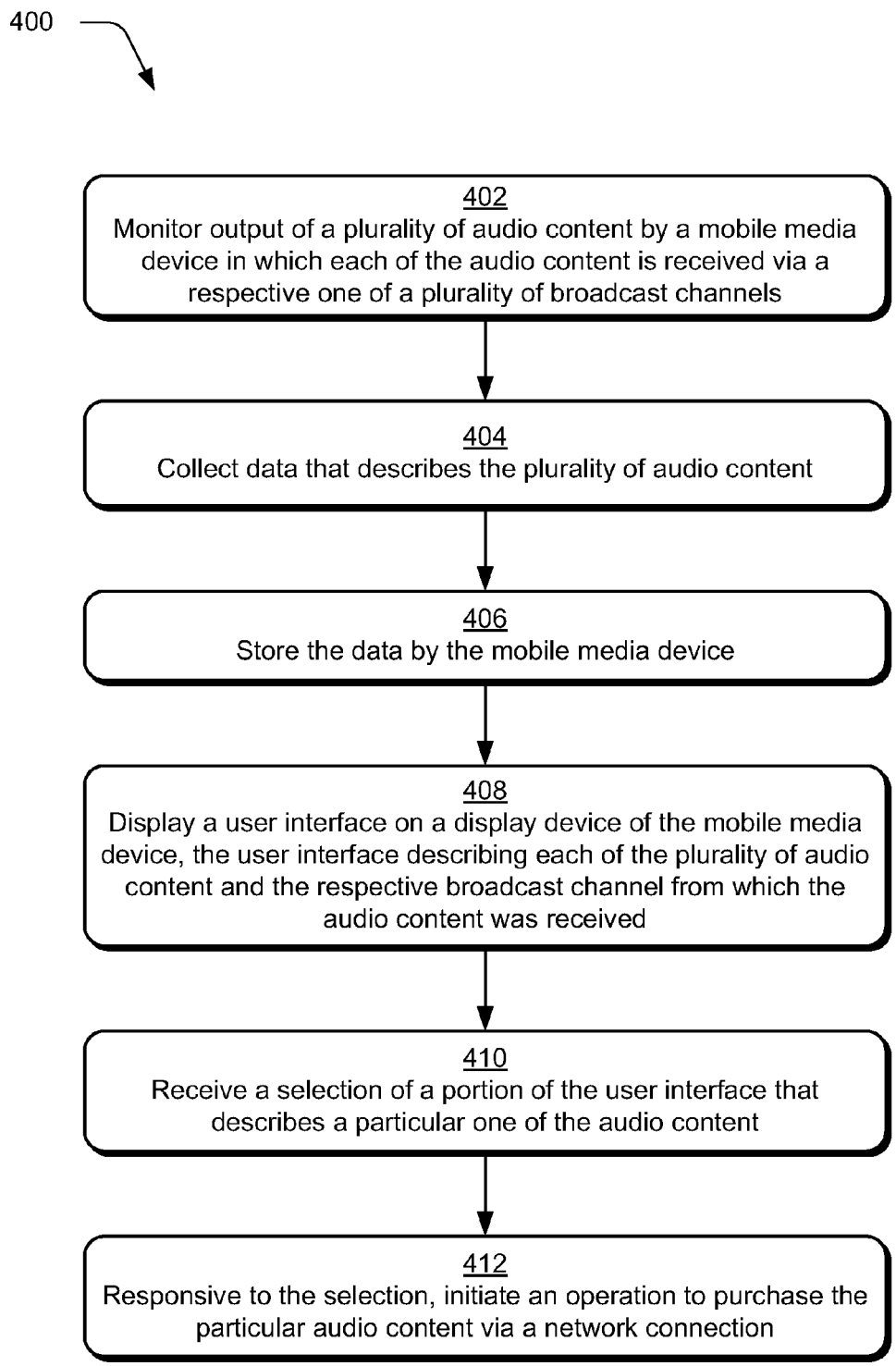
FIG. 4 is a flow diagram depicting a procedure in an example implementation in which output of a plurality of audio content by a mobile media device is monitored and a user interface is displayed that describes the audio content.

FIG. 4 depicts a procedure 400 in an example implementation in which output of a plurality of audio content by a mobile media device is monitored and a user interface is displayed that describes the audio content. Output of a plurality of audio content by a mobile media device is monitored, in which each of the audio content is received via a respective one of a plurality of broadcast channels (block 402). For example, the broadcast channels may correspond to frequencies of an FM radio network, channels of a broadcast received from a satellite, and so on. Therefore, the audio content that is output by the mobile media device 104 may be obtained from a variety of different sources using a variety of different techniques.

Data is collected that describes the plurality of audio content (block 404). Continuing with the previous example, a user may interact with the mobile media player 104 to navigate between a plurality of broadcast channels e.g., radio frequencies, satellite channels, and so on. Accordingly, metadata 118 that is broadcast along with the audio content 108 may be collected during this navigation. The data (e.g., metadata 118) is then stored by the mobile media device (block 406), e.g., to memory or other computer-readable medium.

The user interface is displayed on a display device of the mobile media device, the user interface describing each of the plurality of audio content and the respective broadcast channel from which the audio content was received (block 408).

As shown in FIG. 1, for instance, the user interface 114 describes a broadcast channel used to receive the audio content (e.g., KNND 107.7 FM) and also describes the audio content, e.g., a title "Hero of War," an artist "Rise Against," and an album "Appeal to Reason."

A selection is received of a portion of the user interface that describes a particular one of the audio content (block 410). The user, for instance, may interact with the cursor control device 206 of the mobile media device 104 to select a title or other portion of the information that describes the audio content 108, e.g., an icon including album art. Responsive to the selection, an operation is initiated to purchase the particular audio content via a network connection (block 412). As previously described in relation to FIGS. 2 and 3, for instance, a user may use the mobile media device 104 to navigate to a website via a two-way network (e.g., the Internet) to purchase content that was originally received via a one-way network. The purchased content may then be downloaded to the mobile media device and/or another device, such as a home computer.

Figure 5:
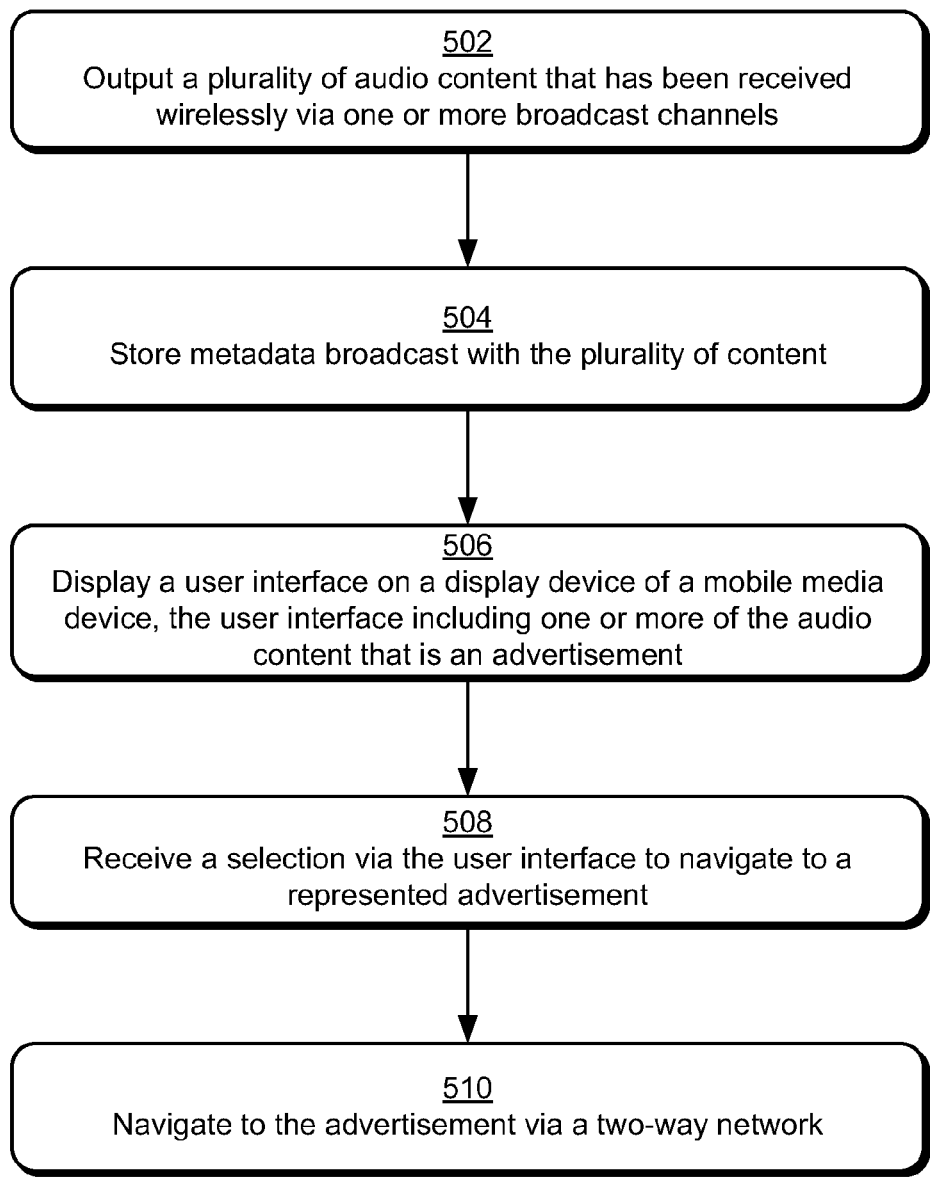
FIG. 5 is a flow diagram depicting a procedure in an example implementation in which a description of an advertisement is included with descriptions of other audio content that was output a mobile media device.

FIG. 5 depicts a procedure 500 in an example implementation in which a description of an advertisement is included with descriptions of other audio content that was output a mobile media device. A plurality of audio content is output that has been received wirelessly via one or more broadcast channels (block 502). Metadata broadcast with the plurality of content is stored (block 504). These techniques may be performed as previously described in relation to FIG. 4.

A user interface is displayed on a display device of a mobile media device, the user interface including one or more of the audio content that is an advertisement (block 506). For example, the audio content 108 broadcast to the mobile media device 104 may also include advertisements for goods or services. A description of the advertisements may also be included in the user interface 114, e.g., that identifies the good or service advertised (a brand name).

A selection is received via the user interface to navigate to a represented advertisement (block 508) and navigation is performed to the advertisement via a two-way network (block 510). The metadata 118 that was streamed with the audio content 108 that is an advertisement, for instance, may include a network address (URL) to a site (e.g., website) that includes additional information that relates to the advertisement. A variety of different information may be included at the site, such as the advertisement itself, a way to purchase the goods or services represented in the advertisement (e.g., via an ecommerce website), additional product literature, and so on. Therefore, two-way functionality of the mobile media device 104 included in the communication module 110 may be used to access the Internet in this example to further leverage advertisements received via a broadcast. A variety of other examples are also contemplated.

Figure 6:
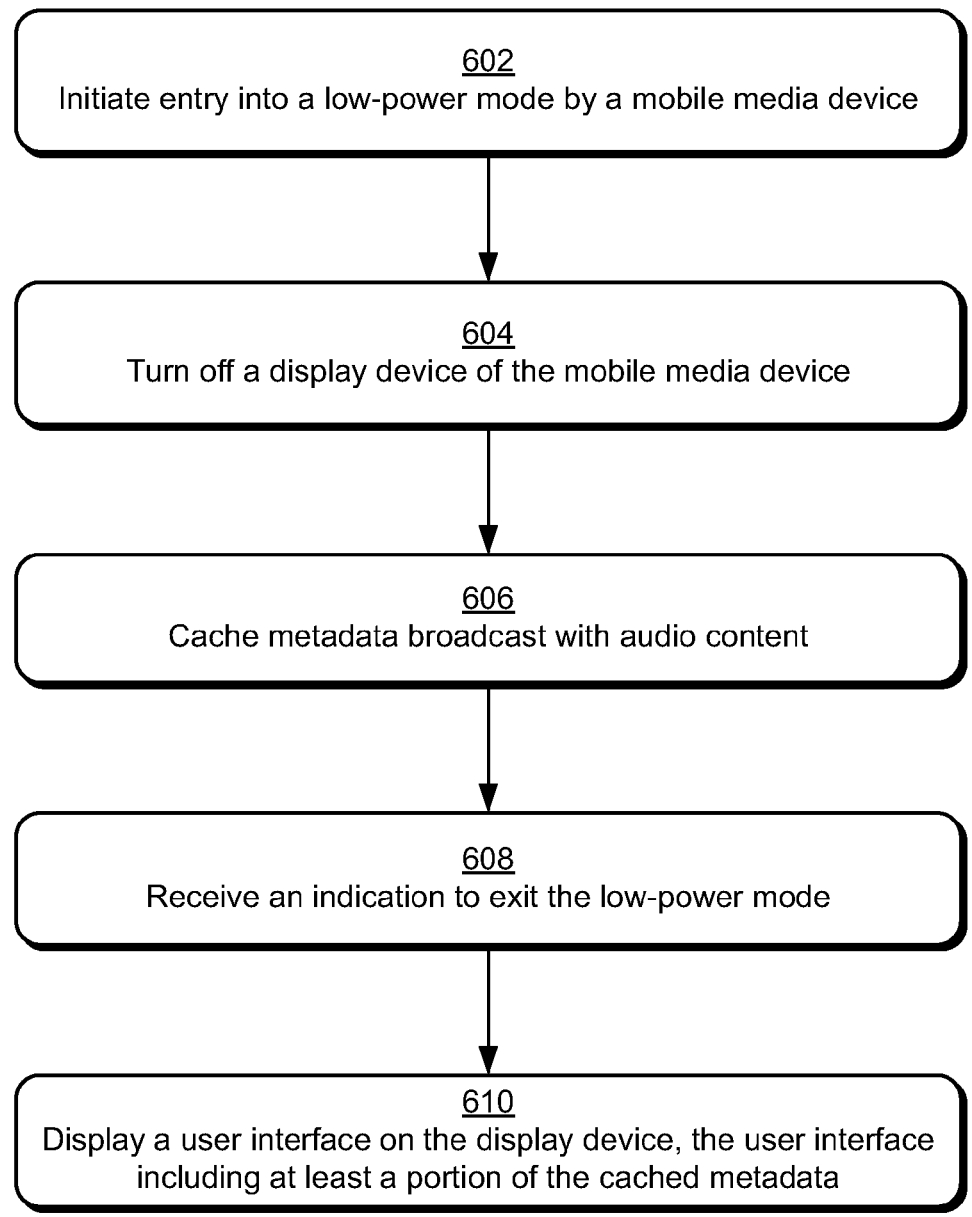
FIG. 6 is a flow diagram depicting a procedure in an example implementation in which metadata is cached while the mobile media device of FIG. 1 is in a low-power mode.

FIG. 6 depicts a procedure 600 in an example implementation in which metadata is cached while the mobile media device 104 is in a low-power mode. Entry into a low-power mode is initiated by a mobile media device (block 602). In this example, the communication module 110 of the mobile media device 104 is configured to cause the mobile media device 104 to enter a low-power mode in which power consumption by one or more components of the device is lessened. For example, the mobile media device 104 may receive FM broadcasts and "time out" after a defined amount of time has passed. In response, a display device 116 of the mobile media device 104 may be "turned off" to conserve power.

Even though the mobile media device is in the low-power mode, however, metadata 118 broadcast with the audio content 108 may be cached in storage 122 of the device as metadata 120 (block 606). Once an indication is received to exit the low-power mode (block 608), a user interface 114 is displayed on the display device 116 that includes at least a portion of the cached metadata (block 610). For example, an input may be received via a button of the mobile media device 104 to "wake up" the device, e.g., pressing the power button or other buttons of the device. Therefore, in this way the metadata 118 may be cached and used when appropriate yet still conserve resources of the mobile media device 104.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
monitoring output of a plurality of audio content by a mobile media device, each said audio content being received via a respective one of a plurality of broadcast channels by the mobile media device; and
displaying a user interface on a display device of the mobile media device, the user interface describing at least each of the plurality of audio content that was previously output and, for each previously output audio content described in the user interface, a simultaneous display of the description of the previously output audio content along with a corresponding description of one of a plurality of broadcast channels from which the previously output audio content was received.

2. A method as described in claim 1, wherein a portion of the user interface that describes a particular said audio content is selectable to initiate an operation to purchase the particular said audio content via a network connection.

3. A method as described in claim 2, wherein the particular said audio content once purchased is downloadable by another media device.

4. A method as described in claim 2, wherein the operation includes authenticating a user of the mobile media device using an authentication service.

5. A method as described in claim 4, wherein the authentication of the user by the authentication service provides access to a plurality of websites, at least one of which is configured to provide the particular said audio content for purchase.

6. A method as described in claim 4, wherein the authentication of the user by the authenticate service is performed automatically and without user intervention using a token that is stored on the mobile media device.

7. A method as described in claim 1, wherein a first said broadcast channel is broadcast using frequency modulation (FM) and a second said broadcast channel is broadcast via satellite.

8. A method as described in claim 1, wherein the user interface describes each of the plurality of audio content using metadata broadcast with respective said audio content.

9. A method as described in claim 1, wherein the user interface describes the plurality of audio content in reverse chronological order of when each of the plurality of audio content was output, respectively.

10. One or more computer-readable storage comprising instructions that are executable by a mobile media device to output a user interface that describes a plurality of content received via a plurality of broadcast channels and output by the mobile media device, the user interface having a plurality of options to purchase the plurality of content for download, the user interface configured to provide a summary of user-navigation by describing each of the plurality of broadcast channels and from which of a plurality of broadcast content providers the content was broadcast from, each associated with a respective one of a plurality of content described in the user interface in a single screen and output by the mobile media device.

11. The one or more computer-readable storage as described in claim 10, wherein the mobile media device is installed in a vehicle.

12. The one or more computer-readable storage as described in claim 10, wherein the plurality of content includes audio content that was received via an FM broadcast and audio content that was received via a satellite broadcast.

13. The one or more computer-readable storage as described in claim 10, wherein the user interface describes the plurality of content in reverse chronological order of when each of the plurality of audio content was output, respectively, by the mobile media device.

14. The one or more computer-readable storage as described in claim 10, wherein the user interface describes the plurality of content in groups arranged by broadcaster.

15. The one or more computer-readable storage as described in claim 10, wherein the user interface has a plurality of options to purchase the plurality of content for download to and local storage by the mobile media device.

16. A mobile media device comprising:
a display device; and
one or more modules configured to output a plurality of audio content that have been received wirelessly via one or more broadcast channels and display a user interface in a single screen on the display device that includes one or more of the audio content that is an advertisement, the user interface configured to display a summary of user-navigation among each of the one or more broadcast channels by describing each said audio content and an associated broadcast channel from a plurality of different content providers, each associated with a respective one of the plurality of audio content, the description of the audio content, the associated broadcast channel, and the corresponding content provider displayed concurrently.

17. The mobile media device as described in claim 16, wherein:
the one or more modules are configured to receive the one or more of the audio content that is an advertisement wirelessly via a one-way broadcast; and
the description of the advertisement is selectable in the user interface to navigate to the advertisement that is accessible by the one or more modules via a two-way network connection.

18. The mobile media device as described in claim 17, wherein the two-way network connection provides an Internet connection and the one-way broadcast is received via a radio broadcast in compliance with frequency modulation (FM).

19. The mobile media device as described in claim 17, wherein the description of the advertisement in the user interface includes metadata that was broadcast with the advertisement.

20. The mobile media device as described in claim 16, wherein the description of the advertisement is selectable in the user interface to navigate to the advertisement via an Internet connection to purchase a good or service that pertains to the advertisement.

* * * * *